United States Patent [19]
Ito et al.

[11] 4,428,663
[45] Jan. 31, 1984

[54] ELECTROPHOTOGRAPHIC COPYING MACHINE

[75] Inventors: Hideo Ito; Yutaka Irie, both of Toyokawa; Minoru Nakamura, Toyohashi, all of Japan

[73] Assignee: Minolta Camera Kabushiki Kaisha, Osaka, Japan

[21] Appl. No.: 398,923

[22] Filed: Jul. 16, 1982

[30] Foreign Application Priority Data

Jul. 20, 1981 [JP] Japan ................................ 56-114026

[51] Int. Cl.³ ............................................ G03G 15/00
[52] U.S. Cl. .................................... 355/14 R; 355/8; 355/3 SH; 355/14 SH
[58] Field of Search .................. 355/8, 14 SH, 3 SH, 355/55, 60, 66, 14 R

[56] References Cited

U.S. PATENT DOCUMENTS 3,554,640 1/1971 Hoskins ................................ 355/8
4,264,188 4/1981 Tomosada et al. ................. 355/8 X Primary Examiner—Richard L. Moses
Attorney, Agent, or Firm—Jackson, Jones & Price

[57] ABSTRACT

An electrophotographic copying machine of the transfer type which comprises a reciprocating member for exposing a photoconductive member to the image of an original when the machine is in a specified copying mode of multi-copying modes, the reciprocating member moves in a reciprocation mode of operation for exposing the photoconductive member and performs a supplementary reciprocating movement enables the reciprocating member to reciprocate repeatedly and continuously without stopping, permitting a paper feeding assembly to feed sheets of paper in succession without any overlapping problem.

12 Claims, 9 Drawing Figures

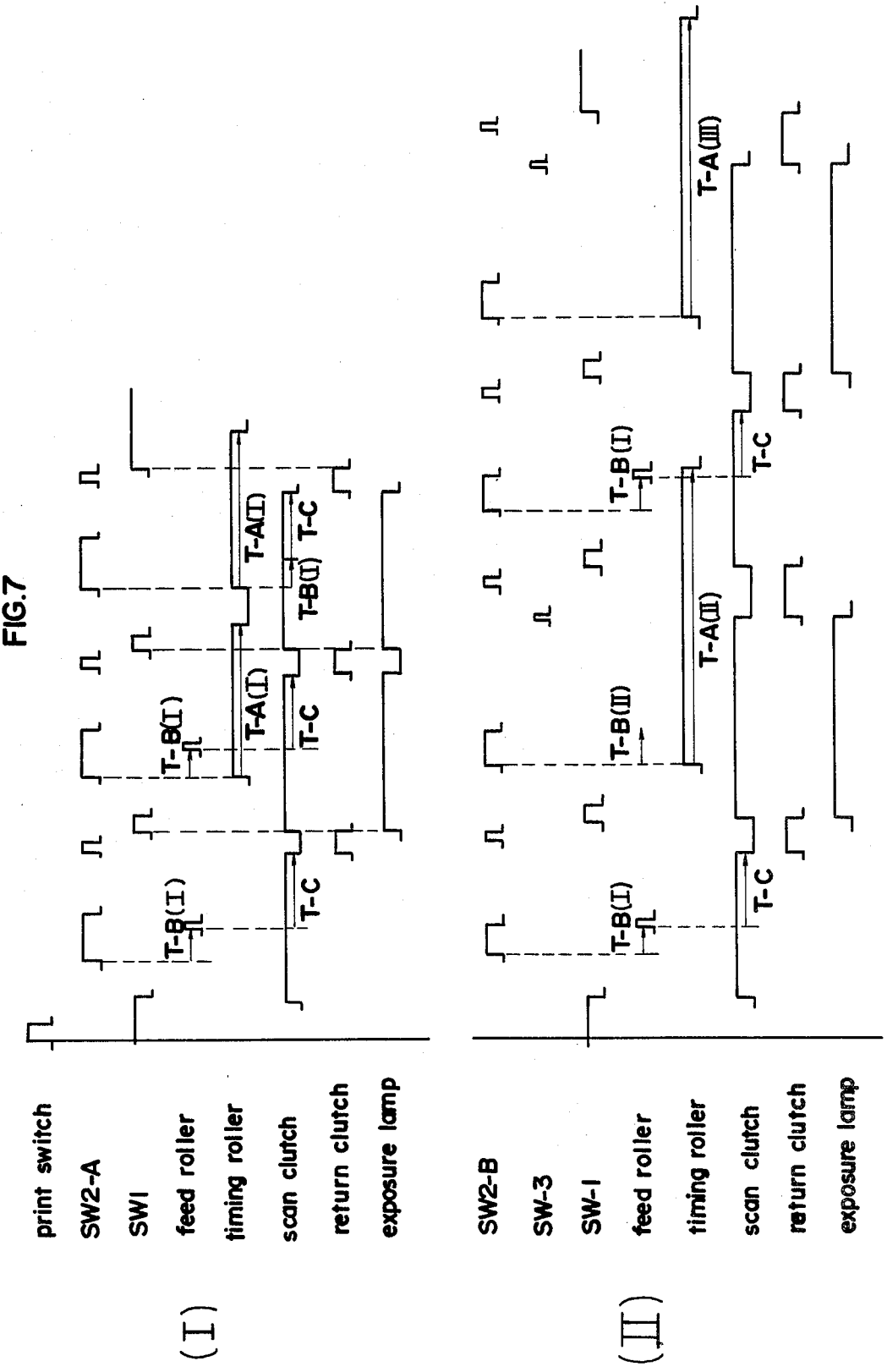

ELECTROPHOTOGRAPHIC COPYING MACHINE

BACKGROUND OF THE INVENTION

1. Field of the Invention

The present invention relates to electrophotographic copying machines of the transfer type, and more particularly to such a copying machine wherein a reciprocating member, such as a reciprocating optical system or reciprocating original carriage, is used for exposing a photoconductive member to the image of an original.

2. Description of the Prior Art

The reciprocating member of electrophotographic copying machines generally perform a scan movement for the exposure of an original and a return movement to the start of the scan position or stationary position. The distance of the reciprocation is conventionally controlled by systems which can be divided generally into two types: one wherein the distance of movement of the reciprocating member is controlled according to the size of paper used for copying, and the other wherein the distance is controlled according to the size of the original or to the size specified by the user for the original.

However, these systems have been found to involve various drawbacks for use in copying machines of improved performance which are adapted for copying, for example, at an increased speed or at a variable magnification.

The control system according to the paper size has the drawback that when paper of large size is used for copying a small original, the reciprocating member uselessly moves also over an area beyond the original, i.e., an area which need not be scanned. The idle movement increases the distance of return movement for the next copying cycle to result in a reduced copying speed. The reduction of the copying speed becomes pronounced in a multi-copying operation.

On the other hand, when the control system according to the size of original is used for multi-copying a small original on paper of large size, the reciprocating member scans a distance corresponding to the size of the original and thereafter returns, but if the copy sheet has not been completely transported before the start of the subsequent scan movement, the reciprocating member must be stopped temporarily until the completion of the transport. Otherwise, another sheet will be fed to overlap the preceding sheet. However, if the reciprocating member is stopped temporarily, the problem of vibration arises when the member is initiated into the subsequent scan movement. Such vibration is avoidable by increasing the pre-scanning distance from the start of scan position to the start of exposure position, but a reduced copying speed will then result. The vibration further adversely affects the drive system and other neighboring devices to shorten their life.

Generally the vibration produced is greater when the reciprocating member is initiated into the scan movement from a stopped position then when it is brought into the scan movement continuously from the return movement. Accordingly the vibration can be reduced if the reciprocating member is not stopped at the start of a scan position. U.S. Pat. No. 3,554,640 discloses a reciprocating original carriage which is adapted to stop at the end of a scan movement, then is started from this position toward the start of a scan position and continuously brought into a scan movement from the return travel. The present applicant proposes in U.S. patent application Ser. No. 177,636 filed on Aug. 8, 1980 a reciprocating member which is brought into preliminary reciprocation at the start of a scan position without any exposure and thereafter is caused to perform a scan movement continuously with the return travel for reciprocation movement during exposure. The reciprocating member can be initiated into the scan movement very smoothly by being biased toward the scan direction with the force accumulated by the return travel and also by being given a drive force for scanning with appropriate timing. With the proposed system, unlike the system of U.S. Pat. No. 3,554,640, the reciprocating member is started at the start of a scan position because a signal emitted during the scan movement of the member is utilized for starting a feeding of a sheet so that the leading end of the sheet can be accurately registered with the image on the photoconductive member. Although the proposed system has the advantage that the scan movement can be initiated very smoothly, the exposure making reciprocation requires the preceding preliminary reciprocation, with the result that if the system is used in combination with the foregoing system wherein the reciprocating member is controlled to move a distance in accordance with the size of original and is adapted to stop temporarily at the start of a scan position to avoid the overlap of sheets, each copying cycle requires two strokes of reciprocation which reduce the speed of the copying operation. Incidentally, the embodiment of the U.S. patent application includes a reciprocating member which moves a distance according to the paper size and continuously travels in reciprocation for multi-copying. The member therefore performs only one stroke of preliminary reciprocation without any exposure.

SUMMARY OF THE INVENTION

Accordingly the main object of the present invention is to provide an electrophotographic copying machine having an improved system for controlling the movement of a reciprocating means.

Another object of the invention is to provide an electrophotographic copying machine having reciprocating means which travels a minimized distance and which repeatedly performs a scan and return movement for multi-copying without interruption and without permitting overlap of paper sheets.

Another object of the invention is to provide an electrophotographic copying machine wherein reciprocating means is caused to perform, before scanning for making an exposure, a preliminary movement including scan and return or return only without any exposure and then brought into an exposing scan movement continuously with the preliminary movement, the copying machine being characterized in that the scanning means is moved a minimized distance without permitting overlap of paper sheets when conducting a multi-copying operation.

The above and other objects are fulfilled by an electrophotographic copying machine of the transfer type including reciprocating means for exposing a photoconductive member to the image of an original, paper feeding means for feeding paper to a transfer position to transfer to the paper an image formed on the photoconductive member in corresponding relation to the original, and means for controlling the reciprocating means so that in a specified copying mode of possible multi-copying modes, the reciprocating means performs, without stopping, a supplementary reciprocating movement involving no exposure between strokes of reciprocating movement for exposing. The above construction permits the paper feeding means to feed sheets of paper in succession without overlapping.

Stated more specifically, the specified copying mode is a mode in which the period of time required for feeding a sheet of paper is longer than the period of time taken for a stroke of reciprocating movement of the reciprocating means. In this mode, the reciprocating means is reciprocated continuously, and the paper size and the reciprocating period of the means are so determined that sheets will overlap if all the strokes of reciprocating movement are used for exposing. Although the reciprocating period of the reciprocating means is dependent basically on the paper size and the magnification of copying the period, when desired, can be so determined as to permit the reciprocating means to move a distance selected by the user.

Stated more specifically, the present invention is applied to an electrophotographic copying machine of the type wherein the reciprocating means is caused to perform a preliminary movement first without any exposure and then an exposing scan movement continuously with the preliminary movement.

Further stated more specifically, in the specified copying mode, paper is fed by the feeding means during the supplementary reciprocating movement.

These and other objects, advantages and features of the invention will become apparent from the following description thereof taken in conjunction with the accompanying drawings which illustrate a specific embodiment of the invention.

BRIEF DESCRIPTION OF THE DRAWINGS

FIG. 7 is a time chart illustrating specific modes of control operation.

In the following description, like parts are designated by like reference numbers throughout the several drawings.

DETAILED DESCRIPTION OF THE INVENTION

Figure 1:
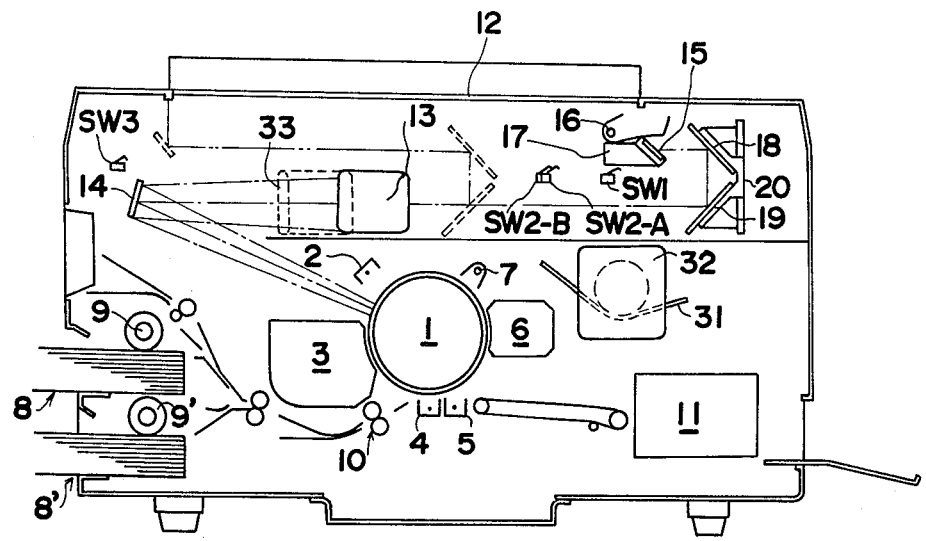
FIG. 1 is a sectional view schematically showing an electrophotographic copying machine to which the invention is applied.

FIG. 1 schematically shows the construction of an electrophotographic copying machine embodying the invention. The copying machine is of the type wherein a photoconductive member is exposed to the image of a original by a reciprocating optical system which is driven by means disclosed in U.S. patent No. 4,344,696, granted on Aug. 17, 1982 stated above. With reference to FIG. 1, a photoconductive drum 1 positioned approximately in the center of the copying machine is surrounded by a charger 2, developing unit 3, transfer charger 4, separating charger 5, cleaner 6 and eraser 7.

Sheets of copy paper are accommodated in stockers 8, 8' at the left of the drawing, fed out one by one by feed rollers 9, 9', sent to the transfer station via timing rollers 10 and discharged from the machine by way of a fixing unit 11.

An illustrated original document placed on a transparent glass plate 12 is scanned by first and second optical members reciprocating under the glass plate 12. The image of the original scanned by the reciprocating optical members is projected on the drum 1 by lens 13 and fixed mirror 14.

Figure 2:
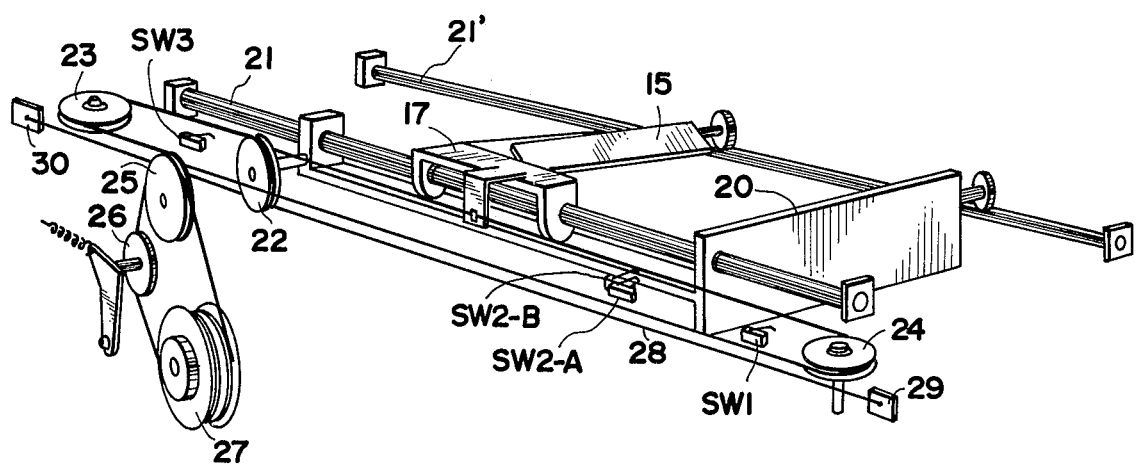
FIG. 2 is a perspective view showing reciprocating optical means included in the copying machine shown in FIG. 1.

Referring to FIGS. 1 and 2, the first optical member comprises a first mirror 15, exposure lamp 16 and a first support frame 17 for supporting these elements. The second optical member comprises a second mirror 18, third mirror 19 and a second support frame 20 for supporting these mirrors.

The first and second support frames 17, 20 are movably supported by guide rods 21, 21' as seen in FIG. 2. The second support frame 20 has a pulley 22. Mounted on the main body of the machine are two fixed pulleys 23, 24 at its opposite ends, and a fixedly pulley 25, tension pulley 26 and drive transmission pulley 27 at a specified position at the right of the drawing. A wire 28 is reeved around these pulleys. The wire 28 extends from a fixed plate 29 and is passed around the pulley 22 on the second support frame 20, fixed to the first support frame 17, reeved around the fixed pulleys 24, 25, then around the tension pulley 26, transmission pulley 27 and fixed pulleys 25, 23 and further around the pulley 22 again and attached to a fixed plate 30, whereby the first support frame 17 is reciprocated at twice the velocity of the second support frame 20.

Arranged along the path of movement of the first support frame 17 are a home position switch SW1, timing switches SW2-A, SW2-B and full movement switch SW3 which operate with the movement of the first support frame 17. The timing switches SW2-A, SW2-B are arranged to be displaced from each other slightly. The switch SW2-A functions for life-size copying, and the switch SW2-B for reduction copying.

Figure 3:
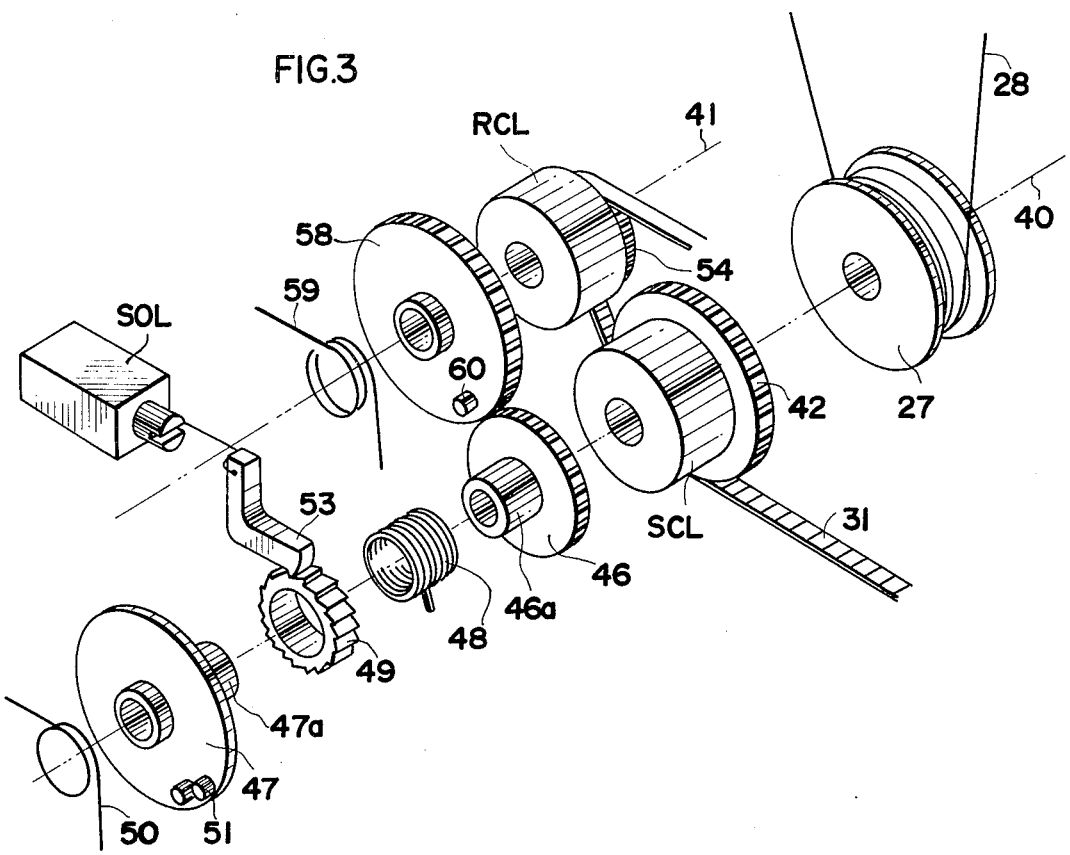
FIG. 3 is an exploded perspective view showing a power transmission mechanism for driving the optical system shown in FIG. 2.

As shown in FIG. 3, the drive transmission pulley 27 is coupled to clutches and biasing means (return spring and scan spring) by shafts 40, 41. The shaft 40 carries the transmission pulley 27, a scan pulley 42, scan clutch SCL, scan gear 46 and return spring operating plate 47. Of these parts, the transmission pulley 27, the clutch plate of the scan clutch SCL and scan gear 46 are fixed to the shaft 40, and the other parts are rotatable on the shaft 40. A kick spring 48 is wound on boss portions 46a, 47a of the scan gear and return spring operating plate 47. A ratchet wheel 49 is loosely fitted around the kick spring 48 on the boss portion 46a. A return spring 50 has one end fixed to a frame and the other end attached by a pin 51 to the operating plate 47. A pawl 53 which is operated by a solenoid SOL is engageable with and disengageable from the ratchet wheel 49.

The shaft 41 extends in parallel with the shaft 40 and has mounted thereon a return pulley 54, return clutch RCL and return gear 58. Of these, the clutch plate of the return clutch RCL and the return gear 58 are fixed to the shaft 41, while the pulley 54 is rotatable on the shaft 41. The return gear 58 is in mesh with the scan gear 46. A scan spring 59 having one end fixed to the frame is loosely fitted around a boss portion of the return gear 58 and has the other end which is engaged with and cocked by a pin 60 on the return gear 58 immediately before the return movement is completed.

The scan pulley 42 and the return pulley 54 are coupled to a drive motor by a timing belt 31 and rotated in the same direction on energization of the motor 32.

With the drive transmission mechanism described above, the scan spring 59 and the return spring 50 are wound up in the final stage of the return and scan movements, and the force thereby accumulated urges the optical members upon the initiation of the scan and return movements. The scan clutch SCL and the return clutch RCL are thereafter engaged for the transmission of the drive force. This mechanism is described in detail in U.S. patent application Ser. No. 177,636 mentioned above.

The mechanism assures smooth and rapid initiation of movement of the optical members upon the change of direction of the movement and is useful for shortening the pre-scanning distance greatly, so that the mechanism is well-suited to the present invention wherein the optical members are continuously reciprocated.

The copying machine further has magnification varying means for making copies in two sizes i.e. in life size and on a reduced scale of 0.7X. For this purpose, the lens 13 is shifted to the broken-line position of FIG. 1 for the reduction and is provided with a supplementary lens 33. The means for shifting the lens and providing the supplementary lens and the means for varying the scanning speed are already known and therefore will not be described.

The copying machine of the construction described above requires a stroke of preliminary reciprocating movement prior to the reciprocating movement for exposing to accumulate an urging force for initiating the optical members into the latter movement. The movement of the optical members further includes the reciprocating movement for exposing and a supplementary reciprocating movement without making any exposure.

Thus the optical members of the present embodiment perform the preliminary reciprocating movement, reciprocating movement for exposing and supplementary reciprocating movement. The optical members are adapted for two kinds of movement, namely a full movement for making a full exposure for the largest copy size (420-mm-long in the scanning direction), and a small movement for making a full exposure for A4 widthwise size (210-mm-long in the scanning direction) in life-size copying and for A4 lengthwise size (297-mm-long in the scanning direction) in reduction copying. The distances of the preliminary reciprocating movement and the supplementary reciprocating movement are set according to the distance of the small movement and the distance of the reciprocating movement for exposing is set according to the length l of paper in the scanning direction and with the copying magnification, as listed in TABLE 1 below. Paper sizes for use in Japan and the U.S. are shown in TABLE 1.

TABLE 1

| Paper Length | $420 \geq l > 297$ | $297 \geq l > 210$ | $210 \geq l$ |
|---|---|---|---|
| Magnification | | | |
| ×1 | (a) Full | (c) Full | (e) Small |
| ×0.7 | (b) Full + Sup. recip. | (d) Full | (f) Small |
| Paper size | A3, B4, Legal | A4 length, B5 length, Letter | A4 width, B5 width, A5 |

The table shows that for multi-copying on the reduced scale with paper of $420 \geq l > 297$, the optical members perform a reciprocating movement for exposing through a full movement and a supplementary reciprocating movement through a small movement for every copying cycle.

Figure 4:
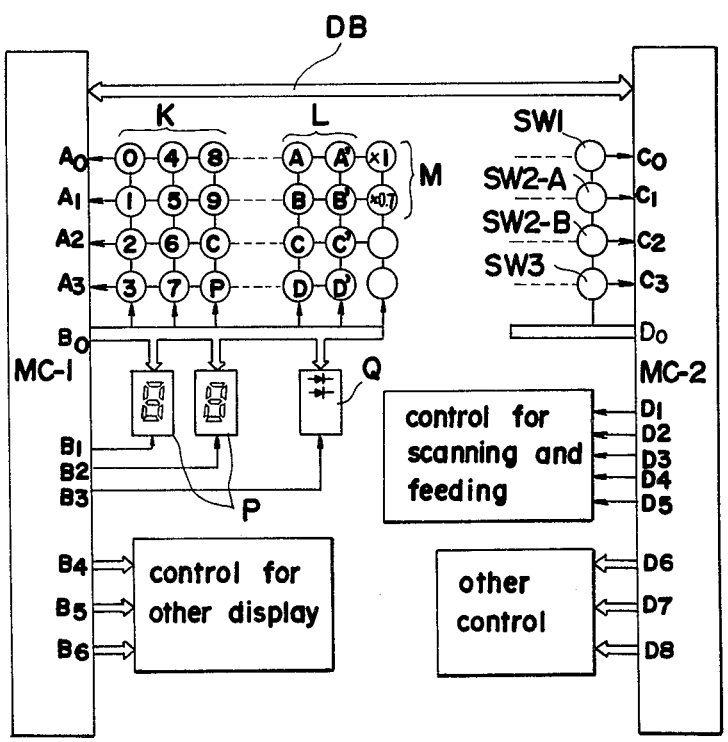
FIG. 4 is a diagram schematically showing control means for the copying machine shown in FIG. 1.

The optical members are controlled for such movements by two microcomputers MC-1 and MC-2 as shown in FIG. 4.

Basically the microcomputer MC-1 receives keyed-in and other external inputs for controlling various displays on the copying machine, while the microcomputer MC-2 receives inputs from control switches within the copying machine to control the operation of the machine. The microcomputers MC-1 and MC-2 are connected together by a data transfer bus DB, through which data is exchanged for the overall control of the copying machine.

Stated more specifically, the microcomputer MC-1 receives at input ports A0 to A3 signals from a print key and number setting keys K, from paper size detecting means L of the upper and lower paper stockers and from magnification selecting keys M, an empty (paper absence) detecting signal and other signals to present with outputs from output ports B0 to B3 displays on a copy number display segments P and on a segment Q for showing the paper size in use and the magnification setting. With outputs from output ports B4 to B6, the microcomputer MC-1 further gives other displays, such as power supply display and empty display, which are not directly relevant to the invention directly.

The microcomputer MC-2, which is connected to the microcomputer MC-1 by the data transfer bus DB, receives signals from the home position switch SW1, timing switches SW2-A, SW2-B, full movement switch SW3 and other control switches at input ports C0 to C3. Based on such signals and also on the data forwarded from the microcomputer MC-1 through the bus DB, the microcomputer MC-2 delivers outputs from output ports D1 and D5 to control the scan clutch SCL, return clutch RCL, solenoid SOL, feed solenoid, etc. for the reciprocation of the optical members and also to control the timing rollers, etc. for the transport of paper. The microcomputer MC-2 further controls other operations with outputs from output ports D6 to D8.

The control effected by the microcomputers MC-1 and MC-2 will be described with reference to the relevant flow charts.

Figure 5:
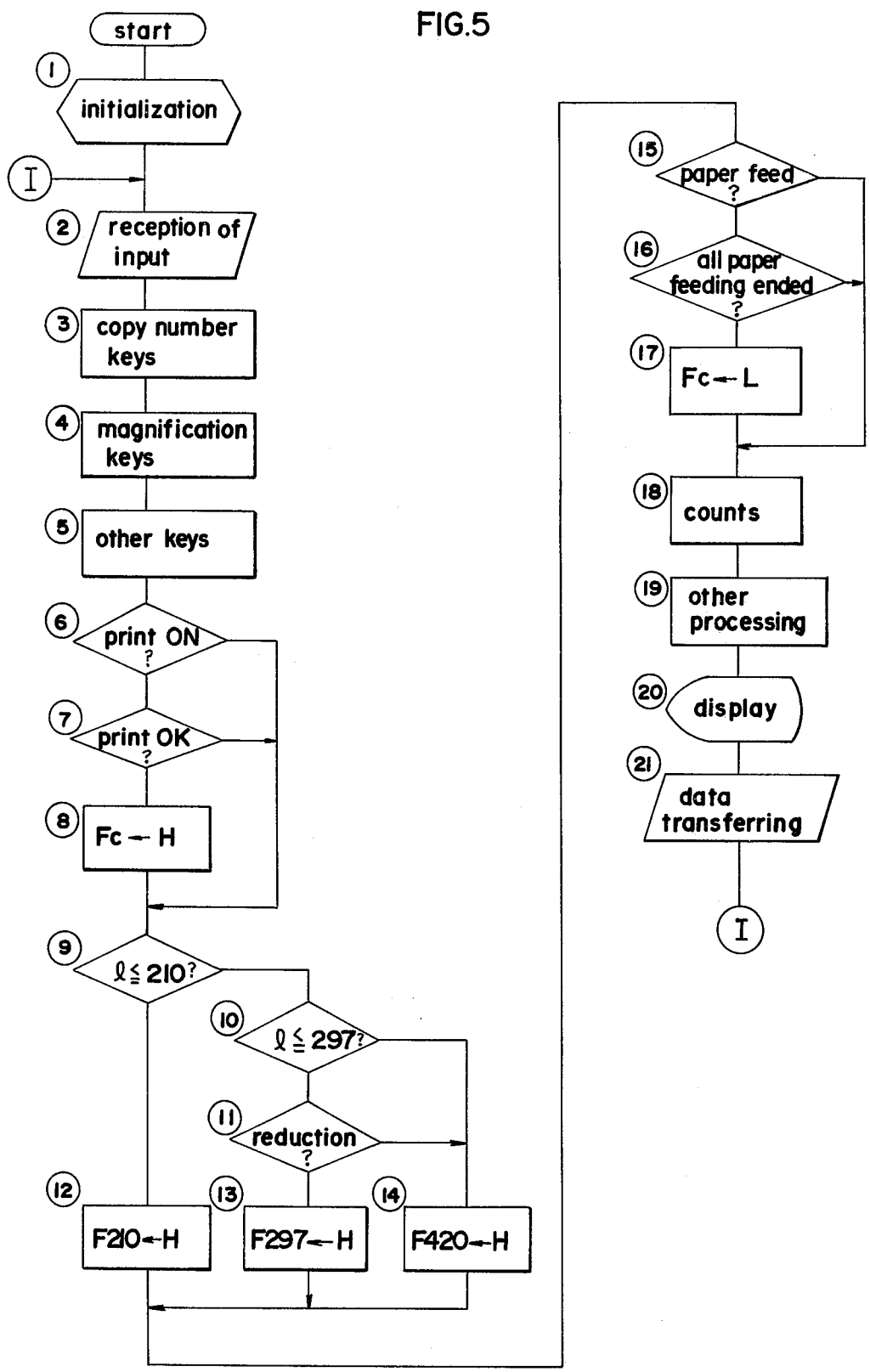
FIG. 5 is a flow chart of a microcomputer MC-1 shown in FIG. 4.

FIG. 5 shows the flow chart of the microcomputer MC-1. The machine is initialized in step 1, in which it is set to prescribed copying conditions. For example, the copy number is set to "1" and the magnification to life size, and the upper stocker is selected for feeding. A copy flag Fc and size flags F210, F297 are set to "L" and a size flag F420 to "H" also in this step for use in the internal processing of the MC-1.

Next, various keyed-in inputs, paper size input and other inputs are received in step 2, followed by step 3 of internal processing for the copy number, step 4 of internal processing for the copying magnification and step 5 of internal processing steps for the other key inputs. These internal processing steps are carried out within the microcomputer MC-1, and the results of the operation are temporarily stored in a random access memory within the MC-1.

Subsequently step 6 checks whether the print key is on. If yes, step 7 checks whether the print conditions are set. If the answer is yes, the copy flag Fc is set to "H". If steps 6 and 7 are no, the copy flag Fc remains "L". Throughout all the flow charts, the line extending downward from the block of inquiry indicates "yes", and the lateral line therefrom indicates "no", except for step 62 mentioned later.

Steps 9 to 14 set the size flags in response to the signals from the paper size detecting means L and magnification selecting key M. More specifically, step 9 checks whether the paper for use has a length in the scanning direction of up to 210 mm. The paper length is checked in step 10 as to whether it is up to 297 mm. Step 11 further determines whether the reduction mode or life-size mode is set. In accordance with the result, one of the size flags F210, F297 and F420 is set to "H". When one of the size flags changes to "H", the other flags become "L". The size flags have the following relation with the distances of movement shown in TABLE 1:

F420: (a), (b), (c)
F297: (d)
F210: (e), (f)

Step 15 checks whether or not paper was fed, for example with use of a signal which remains "H" while the paper feed solenoid is on. The subsequent step 16 compares the number of sheets of paper fed since the start of copying operation with the copy number setting to determine whether the required number of sheets have been fed. If the answer is yes, the copy flag Fc is changed to "L" in step 17.

Based on the comparison made in step 16, internal processing is carried out in step 18 for the copy number counter. Step 19 effects internal processing for other displays.

The results obtained from the internal processing steps 3, 4, 5 and 18, 19 are given to various displays in step 20. These results are transferred to the microcomputer MC-2, while the microcomputer MC-1 receives the data transferred from the MC-2. Step 2 thereafter follows. Thus, the same routine as above is repeated with a unit time of tens of milliseconds.

Figure 6A:
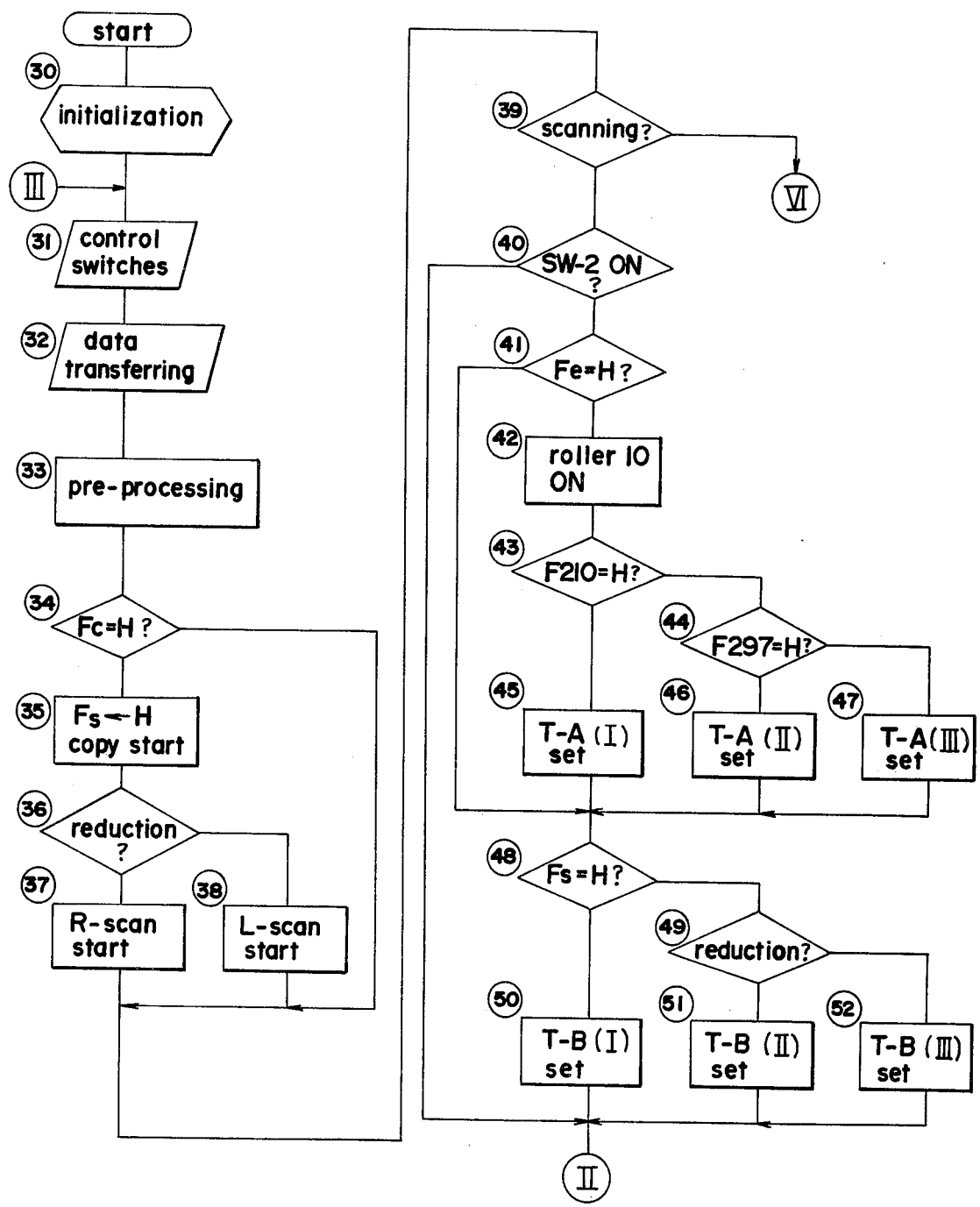
FIGS. 6A, B and C show a flow chart of microcomputer MC-2 shown in FIG. 4.
Figure 6B:
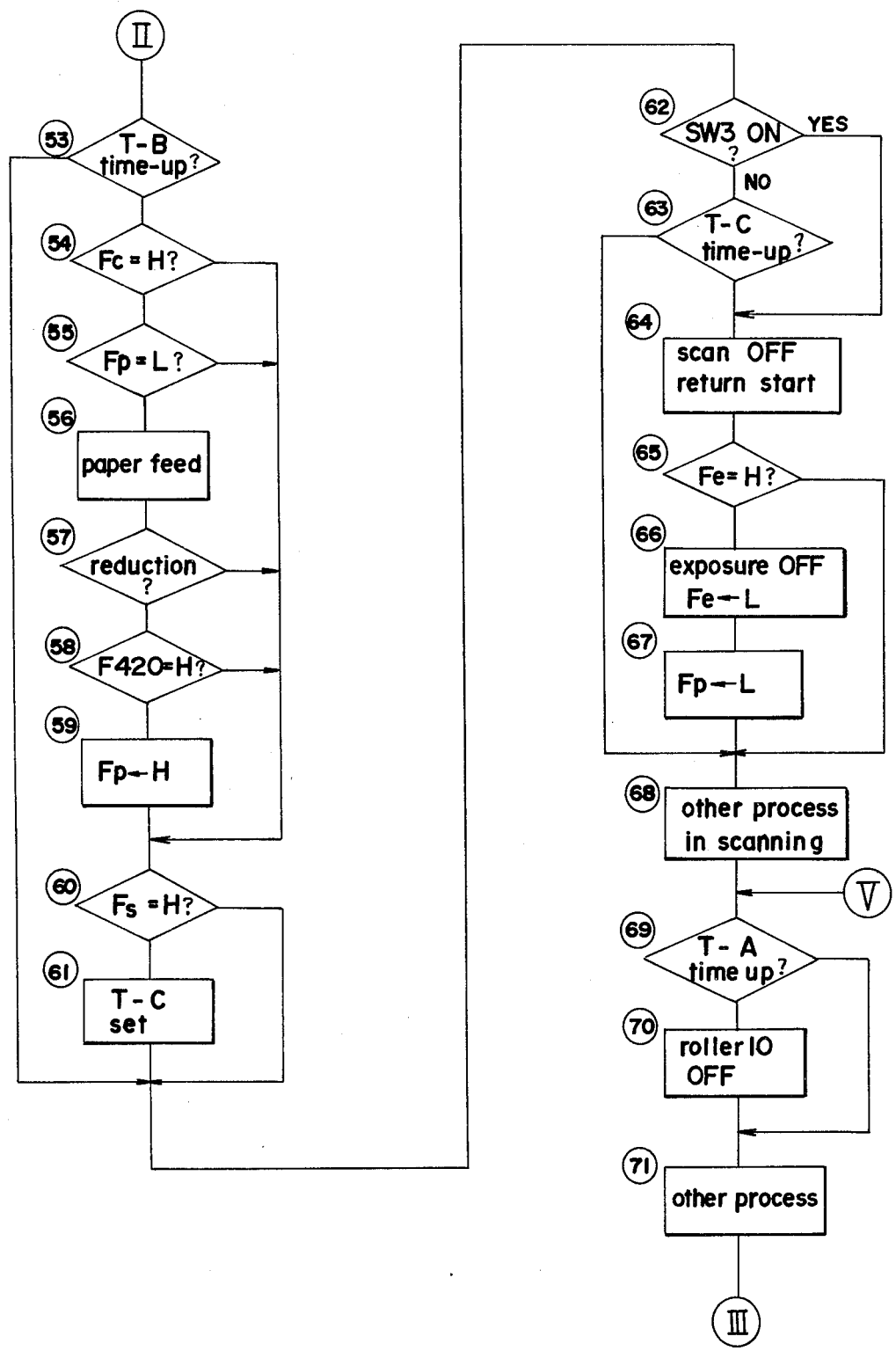
Figure 6C:
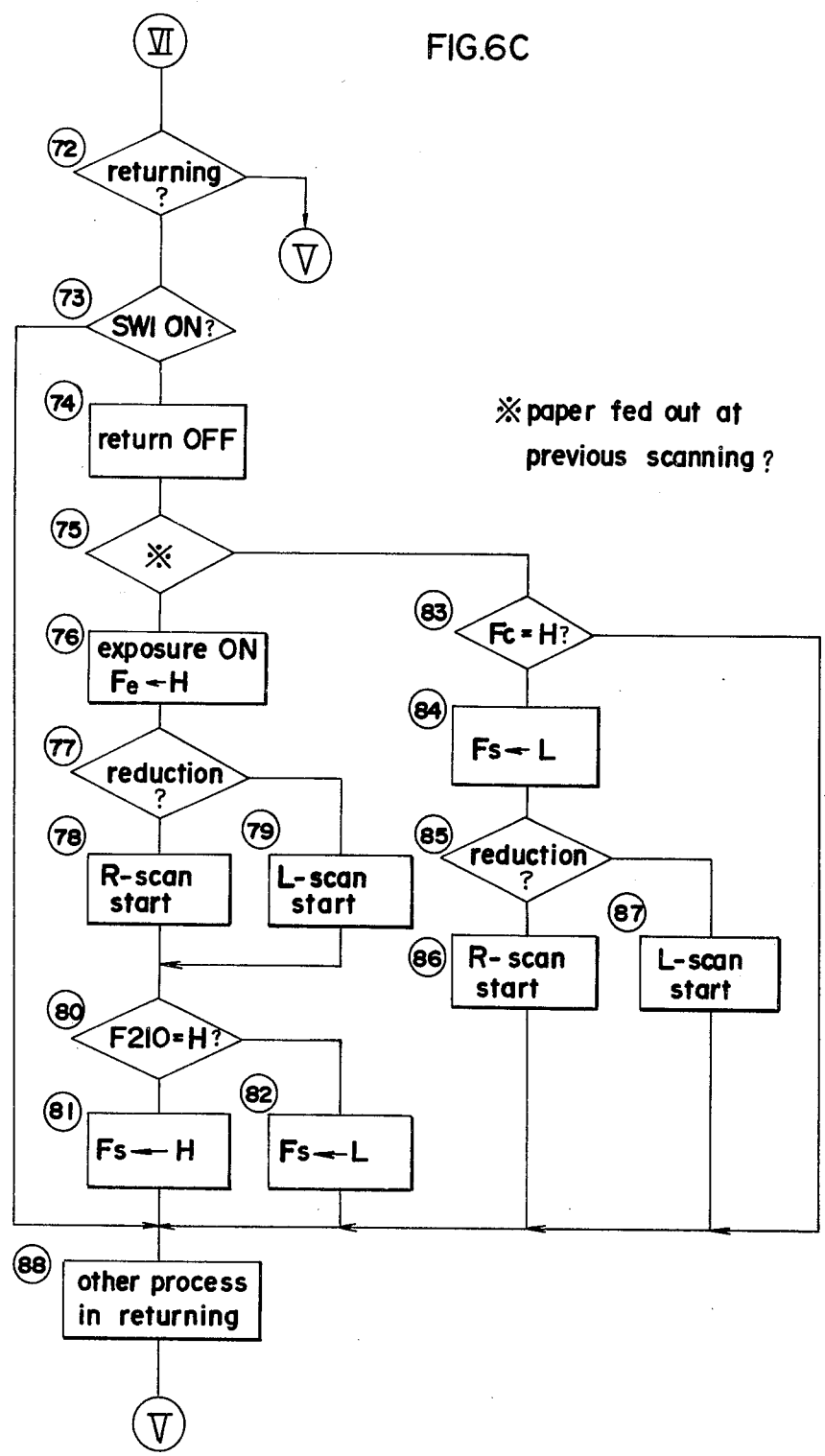

FIGS. 6A, B and C show the flow chart of the microcomputer MC-2. The machine is initialized in step 30 as is the case with the microcomputer MC-1. Flags chiefly for use in internal processing are set by the initialization. In connection with the present invention, an exposure flag Fe and a feed inhibiting flag Fp are set to "L".

The microcomputer MC-2 receives inputs from various control switches in step 31. Of these control switches, those relating to the present invention are the home position switch SW1 which is turned on when the first optical member returns to the home position, the timing switches SW2-A and SW2-B which are turned on by the movement of the first optical member, and the full movement switch SW3 which is turned on upon the first optical member traveling leftward in FIG. 1 through a full movement Subsequently data is transferred between the microcomputers MC-1 and MC-2 in step 32. Pre-processing control is effected in step 33, for example, for preliminary rotation of the photoconductive drum for giving uniform sensitivity thereto and for setting the lens system to the initial condition (life-size setting) when the power supply was turned off in the reduction setting.

Next, step 34 checks whether the copy flag Fc is set to "H" in MC-1. If the answer is yes, the sequence proceeds to steps 35 to 38. In step 35, a small movement flag Fs for setting the distance of movement to that of small movement is set to "H" and a copy start process is performed. Step 36 checks whether the machine is set for a reduction copy. If yes, reduction scan is initiated in step 37. If the machine is in the life-size mode, life-size scan is started in step 38. The control for starting scan in these modes includes setting of the scanning speed and the magnification of the lens system.

The next step 39 checks whether the machine is in the course of a scan. If the answer is yes, the sequence proceeds to step 40. If otherwise, step 72 follows.

Step 40 checks whether the timing switches SW2-A and SW2-B are turned on by the first optical member. One of the timing switches SW2-A and SW2-B is selected by step 4 for the microcomputer MC-1 and step 32 for the microcomputer MC-2.

When the answer to the inquiry of step 40 is yes, step 41 checks whether the exposure flag Fe is "H". If the answer is no, step 48 follows, while if it is yes, step 42 follows to turn on the timing rollers 10.

In steps 43 to 47 following step 42, one of the timers T-A is set according to the size flag set in the microcomputer MC-1. If the size flag which is "H" is F210, a timer T-A (I) is set. If it is F297, a timer T-A (II) is set. If it is F420, a timer TA (III) is set.

In the subsequent steps 48 to 52, one of timers T-B is set in accordance with the distance of movement of the optical members, i.e., with whether the small movement flag Fs is "H" or "L", and also with the copying magnification. More specifically, timer T-B (I) is set if the flag Fs is "H", or timer T-B (II) is set if the flag Fs is "L" in the reduction mode, or timer T-B (III) is set if the flag Fs is "L" in the life-size mode.

Next, step 53 detects lapse of the time set on the timer T-B. The following step 54 checks whether the copy flag Fc set in the routine of the microcomputer MC-1 is "H". If it is "H", step 55 checks whether the feed inhibiting flag Fp is "L". When the answer is yes, step 56 energizes the paper feed solenoid for feeding. Subsequently steps 57 and 58 check whether the set mode is reduction or life size and whether the size flag inhibiting flag F420 is "H". If the answers are both yes, the feed inhibiting flag Fp is changed to "H". The flag Fp is provided to permit feed of paper only when it is "L".

Steps 60 and 64 effect control for determining distance of movement. In steps 60 and 61, a timer T-C is set only when the small movement Flag Fs is "H" and upon the lapse of time set on the timer T-C (step 63), the optical members are brought out of scanning movement into a return movement. If the small movement flag Fs is "L", the members are similarly started for return when the first optical member turns on the full movement switch SW3 (step 62).

The exposure flag Fe is checked in step 65 as to whether it is "H". If the answer is yes, step 66 turns off the exposure lamp 16 and changes the exposure flag Fe to "L". The feed inhibiting flag Fp is changed to "L" in step 67.

Since the sequence is divided by step 39 and the step 72 to be described later into the routine of steps 40 to 68 involving the scan and initiation of return, and the routine of steps 73 to 88 involving the return and start of scan, step 68 effects the other control to be performed during the scan. Similarly the other control to be conducted during the return is effected in step 88.

Step 69 checks the timer T-A for the lapse of time set thereon by steps 45 to 47 to stop the timing rollers 10. Thus the timing rollers 10 continuously rotate during the period of time set on the timer T-A.

Step 71 effects control for other process which is not relevant to the invention directly. The sequence thereafter returns to step 31.

If the answer to the inquiry of step 39 is no, step 72 follows to check whether the optical members are in the course of return. If yes, the following steps 73 to 88 are performed. If otherwise, the sequence proceeds to step 69.

Step 73 checks whether the first optical member turned on the home position switch SW1. If yes, the return movement is discontinued.

Step 74 checks whether paper was fed during the preceding scan. If the answer is yes, step 76 follows, while if it is no, step 83 follows.

The exposure lamp 16 is turned on and the exposure flag Fe is changed to "H" in step 76. Subsequently scan is initiated in accordance with the reduction or life-size mode in steps 77 to 79. Steps 78 and 79 effect the same control as in the foregoing steps 37 and 38.

In the next steps 80 to 82, the small movement flag Fs is changed to "H" if the size flag F210 is "H", or the flag Fs is changed to "L" if the other size flags F297 and F420 are "H".

If step 75 proves no, step 83 checks whether the copy flag Fc is "H". If the answer is yes, the small movement flag Fs is changed to "L" in step 84, and scan is initiated in the mode in accordance with the magnification as in the preceding steps 77 to 79.

As already mentioned with reference to step 68, step 88 effects the other control to be performed during return. Step 69 thereafter follows to repeat the routine.

With reference to the flow charts described above and to the time chart of FIG. 7, the operation of the embodiment will be described in detail.

(I) When two life-size copies are made with A4 size paper fed in the direction of its width (see FIG. 7 (I))

With reference to the flow chart of the microcomputer MC-1, steps 1 and 5 are performed first, wherein the copy number is set to "2" with a number setting key K in step 3, and the magnification is set to life size in step 4. In steps 9 to 14, the size flag F210 is set to "H" since the width of A4 size is 210 mm.

With reference to the flow chart of the microcomputer MC-1, steps 30 to 33 are performed.

When the print switch is depressed with the machine set in condition for printing, the copy flag Fc changes to "H" in steps 6 to 8 in the flow chart of the microcomputer MC-1. Under the control of the microcomputer MC-2 to be described later, the copy number is checked and the counter is controlled in steps 15 to 18. When the specified number of copies have been made, the copy flag Fc changes to "L" in step 17.

When it is confirmed from the data from the microcomputer MC-1 that the copy flag Fc is set to "H" (step 34 in the sequence of microcomputer MC-2), the small movement flag Fs is set to "H" first to start life-size scan, which corresponds to the aforementioned preliminary reciprocating movement over the distance of small movement.

During the preliminary scan, the first optical member turns on the timing switch SW2-A, whereupon the sequence proceeds from step 40 to step 41 to check the exposure Flag Fe. In this stage, the exposure flag is "L" as initially set, so that the timer T-B (I) is set in steps 48 and 50. Upon the lapse of time set on the timer T-B (I), the paper feed means is turned on in steps 54 to 56. Thus the first sheet of paper is fed during the preliminary reciprocating scan movement. Incidentally, the feed inhibiting flag Fp in step 55 is "L" as initially set.

The sequence proceeds from step 57 to step 60, and the timer T-C is set in step 61.

As the scan of the preliminary reciprocating movement proceeds, the lapse of time set on the timer T-C is detected in step 63, whereupon the optical members are initiated into return of the preliminary movement.

Immediately before the completion of the return movement, the first optical member turns on the home position switch SW1, whereby the return is completed. Since the following step 75 detects that the sheet has been fed during the preliminary scan, steps 76 to 79 turn on the exposure lamp 16, change the exposure flag Fe to "H" and start life-size scan to expose the original to light for making the first copy. The small movement flag Fs remains "H" in steps 80 and 81.

During the exposure making scan, the first optical member turns on the timing switch SW2-A, which is detected by step 40, whereupon step 41 checks the exposure flag Fe which was changed to "H" for the start of the exposure making scan. The timing rollers 10 are started in step 42, whereby the first sheet fed out during the preliminary scan and retained by the rollers 10 is advanced again toward the transfer station.

The timer T-A (I) is set by steps 43, 45 and the timer T-B (I) is set by steps 48, 50. Upon the lapse of time set on the timer T-B (I), the second sheet is fed through steps 53 to 56. The timer T-C is set by steps 60, 61.

When the second sheet is fed out, the routine of the microcomputer MC-1 confirms the completion of feed of the required number of sheets through steps 15 to 17, with the copy flag Fc changed to "L" in step 17.

Upon the lapse of time set on the timer T-C in step 63, the exposure making scan changes to a return movement in step 64. The exposure lamp 16 is turned off, and the exposure flag Fe is changed to "L" through steps 65, 66.

After the return of the reciprocating movement for exposing is completed, the optical members are reciprocated for making an exposure for the second copy in the same manner as the exposure making reciprocation for the first copy, except that no sheet is fed since the copy flag Fc is "L" in step 54 during the exposure scan for the second copy.

When the exposure scan for the second copy is completed upon the lapse of time set on the timer T-C and the subsequent return is thereafter completed, the sequence proceeds to step 75, which proves no and further to step 83, which is also no. The optical members therefore stop. On the other hand, the timing rollers 10 stop thereafter upon the lapse of time set on the timer T-A (I).

During the operation described above, the optical members perform a stroke of preliminary reciprocating movement and two strokes of reciprocating movement for exposing, i.e., three strokes of reciprocation, without stopping. Since there is no need to stop the reciprocation of the optical members in connection with the feed of sheets in the above case, no supplementary reciprocating movement is conducted.

(II) When two copies on a reduced scale of 0.7X are made with A3 size paper fed in the direction of its length (see FIG. 7 (II)).

In this case, the optical members perform a full movement to scan an original of A3 size, while the copy which is on a reduced scale of 0.7X corresponds to paper of A4 size as fed in the direction of its length. However, paper of A3 size is used for copying, so that if it is attempted to reciprocate the optical members continously with sheets of paper fed also continously, the sheets will overlap. To render the optical members movable continously in reciprocation without such overlap, the members are caused to perform a supplementary reciprocating movement between strokes of reciprocating movement for exposing.

For this purpose, the machine is controlled in the following mode. While the sequence for the microcomputer MC-1 is substantially the same as in the case (I), the size flag F420 is set to "H" and the other size flags F210 and F297 are set to "L" through steps 9, 10 and 14 since the paper size is 420 mm.

Further in the sequence for the microcomputer MC-2, the preliminary reciprocating movement is effected by a small movement as in the case (I). However, since reduction copies are to be made, the optical members are initiated into preliminary scan at a velocity specified for reduction copying in steps 36 and 37. Further through steps 80 and 82 following the return of preliminary movement, the small movement flag Fs is changed to "L".

Further when the timing switch SW2-B is turned on during the preliminary scan, the timer T-B (I) is set for feeding a sheet of paper. When the first sheet is fed in step 56, the sequence proceeds to steps 57 to 59 to change the feed inhibiting flag Fp to "H", whereby the supplementary reciprocating movement to be described below is performed between strokes of reciprocation for exposing.

During the first exposure making scan movement subsequent to the preliminary reciprocating movement, the timing switch SW2-B is turned on, whereupon the timing rollers 10 are driven in step 42 to transport the first sheet. One of the timers T-A, i.e., the timer T-A (III), is set through steps 43, 44 and 47, and one of the timers T-B, i.e,. T-B (II), is set through steps 48, 49 and 51. Although another sheet is usually fed upon the lapse of time set on the timer T-B, the feed inhibiting flag Fp is now "H", the sequence skips from step 55 to step 60 without feeding the sheet.

When the first return for exposing is started, the feed inhibiting flag Fp is changed to "L" in step 62. When the return is subsequently completed, the sequence proceeds from step 75 to step 83 since no sheet is fed during the first exposure scan. The small movement flag Fs is changed to "H", and a supplementary reciprocating movement is performed through the small movement without any exposure, through steps 84, 85 and 86.

When the timing switch SW2-B is turned on during the supplementary scan, the timer T-A is not set since the exposure flag Fe is "L". The timer T-B (I) is set through steps 48 and 50. A second sheet is fed upon the lapse of time set on the timer T-B (I).

Immediately after the feed of the second sheet, the time set on the timer T-A (III) during the first exposure scan is elapsed, whereby the timing rollers 10 are stopped to hold the leading end of the second sheet thereon.

Further since the small movement flag Fs is set to "H" for the supplementary reciprocating movement, the timer T-C is set through steps 60 and 61 with the lapse of time set on the timer T-B (I). The scan changes to return upon the lapse of time set on the time T-C.

Subsequently the optical members are reciprocated for exposing for the second copy in the same manner as the exposing reciprocation for the first copy. Since the feed of the required number of sheets was completed during the supplementary scan, the copy flag Fc is changed to "L" in the sequence of the microcomputer MC-1. The optical members are stopped on completion of the return subsequent to the second exposing movement As will be apparent from the time chart (II) of FIG. 7, the second sheet will overlap the first sheet in the case (II) if fed upon the lapse of time set on the timer T-B (II) during the first exposing scan. To avoid this and also to reciprocate the optical members continuously, the feed inhibiting flag Fp is changed to "H" upon the feed of the first sheet, and no paper is fed during the supplementary reciprocating movement following the first reciprocating movement for exposing.

Because the supplementary reciprocating movement thus intervenes between strokes of exposing reciprocation, the reciprocating optical members can be reciprocated without stopping and free of the adverse effect that would result from vibration. This gives greatly increased durability to the optical members and neighboring devices.

While the foregoing embodiment of the invention is a system wherein the distance of movement of the optical members is determined basically according to the size of paper, the embodiment can be modified variously. Although the distance of movement is thus dependent essentially on the paper size, means for determining the distance of movement in accordance with the original, e.g., a small movement selecting key, may be provided which is used in preference to effect the supplementary reciprocating movement when desired in accordance with the paper size and the distance of movement. When an original of small size is copied on paper of large size, this serves to light up the exposure lamp for a shortened period of time and also to reduce the rise of temperature within the machine due to the exposure lamp.

In the above embodiment, the paper feed signal is obtained by detecting the movement of the optical member. This has the advantage that the leading end of the paper can be registered accurately with the leading end of the image formed on the photoconductive member by the movement of the optical members.

While the supplementary reciprocating movement of the reciprocating optical means, which is characteristic of the invention, is performed between strokes of exposing reciprocation only when desired, a suitable distance of movement may be specified for the supplementary movement, or optimum distances of movement may be set for each of copying modes necessitating the supplementary movement.

According to the embodiment described above, the invention is applied to the reciprocating means drive system proposed by the present applicant in U.S. patent application Ser. No. 177,636 filed on Aug. 8, 1980 wherein reciprocating means is initiated into a scan movement by being assisted with a force accumulated by the preceding return movement and is also given a drive force for scanning with optimum timing. However, the invention is not limited to this embodiment but can be applied also to the drive system disclosed in U.S. Pat. No. 3,544,640 and to usual systems for driving the reciprocating means.

Although the present invention has been fully described by way of examples with reference to the accompanying drawings, it is to be noted that various changes and modifications will be apparent to those skilled in the art. Therefore, unless otherwise such changes and modifications depart from the scope of the invention, they should be construed as being included therein.

What is claimed is:

1. An electrophotographic copying machine of the type in which a reciprocating means reciprocates for exposing a photoconductive member successively to an image of an original and the image formed on the photoconductive member is transferred to a sheet of paper fed by paper feeding means, the machine comprising:

means for controlling said reciprocating means in a specified mode of possible multi-copying modes so as to move said reciprocating means continously without stopping in such a manner that a supplementary reciprocating movement, involving no exposure, is caused to intervene between the strokes of reciprocating movement that experience an exposure of the photoconductive member.

2. An electrophotographic copying machine as claimed in claim 1, wherein said specified copying mode is a mode in which the period of time required for feeding a sheet of paper is longer than the period of time necessary for a stroke of reciprocating movement during an exposing mode of operation.

3. An electrophotographic copying machine as claimed in claim 2, wherein said specified copying mode is determined from variable parameters in which at least the paper size and magnification ratio are included.

4. An electrophotographic copying machine as claimed in any one of claims 1 to 3, further including a support member for the original wherein said reciprocating means includes first and second optical members reciprocating under the original support.

5. An electrophotographic copying machine of the type in which a reciprocating means reciprocates for exposing a photoconductive member successively to an image of an original and carries out a preliminary movement without any exposure of the photoconductive member and then an exposing scan movement repetitively occurs following the preliminary movement, the image formed on the photoconductive member is transferred to a sheet of paper fed by paper feeding means, said machine comprising:

means for controlling said reciprocating means in a specified mode of possible multi-copying modes so as to move said reciprocating means continuously without stopping in such a manner that a supplementary reciprocating movement involving no exposure is caused to intervene between the respective strokes of reciprocating movement for exposing the photoconductive members.

6. An electrophotographic copying machine as claimed in claim 5, wherein said specified copying mode is a mode in which the period of time required for feeding a sheet of paper is longer than the period of time taken for a stroke of reciprocating movement for exposing the photoconductive member.

7. An electrophotograhic copying machine as claimed in claim 6, wherein said specified copying mode is determined from variable parameters in which at least the paper size and magnification ratio are included in selecting the specific copying mode.

8. An electrophotographic copying machine as claimed in any one of claims 5 to 7, further including a support for the original and wherein said reciprocating means includes first and second optical members reciprocating under the original support.

9. An electrophotographic copying machine as claimed in claim 5 wherein the distance over which the supplementary reciprocating movement occurs is the same as the preliminary movement.

10. In an improved electrophotographic copy machine having a movable photoconductive member for receiving an image of an original, paper feeding means for feeding a paper sheet in timed relationship with the photoconductive member to cause a transfer of the image to the paper sheet, means for selecting a multi-copy cycle of operation, timing means for controlling the feed of paper sheets to the photoconductive member, means for selecting a paper size, means for exposing the original and a reciprocating means for varying the scanning optical path across the original during each stroke of movement, the improvement comprising:

control means for either successively exposing the original during a scanning reciprocation to produce an image on the photoconductive member on successive reciprocation strokes and permitting the timing means to feed a paper sheet on each reciprocation or to cause the feeding of a paper sheet only on alternative reciprocation strokes depending on the paper size selected in a multi-mode of operation, whereby vibration is substantially reduced due to the constant movement of the reciprocating means.

11. The invention of claim 10 wherein the reciprocating means moves at a rate of speed faster than the speed of the paper feeding means.

12. The invention of claim 10 wherein the control means further includes means for initiating a preliminary reciprocating means movement prior to exposure of the original in a copying cycle.

* * * * *